US008417655B2

(12) United States Patent
Pele et al.

(10) Patent No.: US 8,417,655 B2
(45) Date of Patent: Apr. 9, 2013

(54) PATTERN MATCHING

(75) Inventors: Ofir Pele, Jerusalem (IL); Michael Werman, Jerusalem (IL)

(73) Assignee: Yissum Research Development Company of The Hebrew University of Jerusalem LTD., Jerusalem (IL)

( * ) Notice: Subject to any disclaimer, the term of this patent is extended or adjusted under 35 U.S.C. 154(b) by 0 days.

(21) Appl. No.: 12/302,886

(22) PCT Filed: May 30, 2007

(86) PCT No.: PCT/IL2007/000657
§ 371 (c)(1),
(2), (4) Date: Jul. 27, 2009

(87) PCT Pub. No.: WO2007/138593
PCT Pub. Date: Dec. 6, 2007

(65) Prior Publication Data
US 2009/0297037 A1 Dec. 3, 2009

Related U.S. Application Data

(60) Provisional application No. 60/803,437, filed on May 30, 2006, provisional application No. 60/898,093, filed on Jan. 30, 2007.

(51) Int. Cl.
G06F 17/00 (2006.01)
G06N 5/00 (2006.01)

(52) U.S. Cl.
USPC .......................................................... 706/45

(58) Field of Classification Search ..................... 706/45
See application file for complete search history.

(56) References Cited

U.S. PATENT DOCUMENTS

| 4,700,398 | A  | * | 10/1987 | Mizuno et al. ................ | 382/108 |
|-----------|----|---|---------|---------------------------------|------------|
| 6,185,527 | B1 | * | 2/2001  | Petkovic et al. .............    | 704/231    |
| 6,571,199 | B1 | * | 5/2003  | Floratos et al. ..............  | 702/179    |
| 6,763,148 | B1 | * | 7/2004  | Sternberg et al. .............  | 382/293    |
| 2005/0025242 | A1 | * | 2/2005 | Ma et al. .................. | 375/240.16 |
| 2007/0014467 | A1 | * | 1/2007 | Bryll ............................ | 382/152    |

OTHER PUBLICATIONS

Hans J. Vos ("A Bayesian Procedure in the Context of Sequential Mastery Testing") University of Twente, The Netherlands.*
International Search Report PCT/IL2005/000657, filed May 30, 2005.

(Continued)

*Primary Examiner* — Kakali Chaki
*Assistant Examiner* — Ababacar Seck
(74) *Attorney, Agent, or Firm* — Pearl Cohen Zedek Latzer, LLP

(57) ABSTRACT

A method of determining whether two patterns having a plurality of homologous regions match, comprising: generating a set of decisions associated with values (k,n) for determining whether the patterns match, where k, is a number of non similar homologous regions from a sample of size, n, of the homologous regions; constraining the decisions so that a probability of providing a false negative decision that there is no match when in fact there is a match is less than or equal to a predetermined upper bound; configuring the association of decisions and pairs (k,n) to minimize running time of a computer programmed to use the set of decisions to determine whether there is a match; and using a computer programmed with the set of decisions to determine if the patterns match.

21 Claims, 3 Drawing Sheets

OTHER PUBLICATIONS

J.A.G. Pereira and N.D.A. Mascarenhas: "Digital Image Registration by Sequential Analysis": Computer and Graphics, vol. 8, No. 3, 1984, pp. 247-253, Section 2: Sequential tests of hyptheses, Section 3. "Image Registration using the Gaussian Model".

Matas J. et al.: "Randomized RANSC with Sequential Probability Ratio Test", Computer Vision, 2005. ICCV 2005. Tenth IEEE International Conference on Beijing, China Oct. 17-20, 2005, Piscataway, NJ, USA, IEEE, Oct. 17, 2005, pp. 1727-1732, IBSN: 0-7695-2334-X, Section 2. "The Optimal Sequential Test".

Hel-Or Y et al.: "Real time pattern matching using projection kernels" Proceedings of the Eight IEEE International Conference on Computer Vision (ICCV). Nice, France, Oct. 13-16, 2003, International Conference on Computer Vision , Los Alamitos, CA: IEEE Comp.Soc., Us, vol. 2 of 2 Conf.9, Oct. 13, 2003, pp. 1486-1493.

Barnea D. I. Et al.: "A Class of Algorithms for fast digital image Registration" IEEE Transactions on computers, IEEE SErvice Center, Los Alamitos, CA,US, vo. C-21, No. 2, Feb. 1972, pp. 179-186.

* cited by examiner

PATTERN MATCHING

RELATED APPLICATIONS

The present application is a US National Phase of PCT Application No. PCT/IL2007/000657, filed on May 30, 2007, which claims benefit under 35 U.S.C. 119(e) of U.S. Provisional Applications 60/803,437 and 60/898,093 filed on May 30, 2006 and Jan. 30, 2007 respectively, the disclosures of which are incorporated herein by reference.

FIELD OF THE INVENTION

The invention relates to methods for determining whether a first pattern matches a second pattern.

BACKGROUND

Pattern matching generally refers to finding a pattern in a series of events that sufficiently resembles a given particular pattern, so that the series of events can be considered to comprise the given particular pattern. For pattern matching in computer image processing, series of events are images comprising pixels, which are the events. Patterns in the images are patterns of color values (including, optionally, black, white and grays) of pixels that typically define features, such as for example various objects, people and animals, in the images. Pattern matching with respect to a given image refers to determining whether a pattern of pixel color values in the given image sufficiently resembles that of an image of a particular feature so that it can be determined whether the given image comprises an image of the feature.

Generally, to perform pattern matching to locate a particular feature in a "target" image, a usually rectangular "mask-pattern" of pixel values that are considered to define an image of the feature is scanned across the target image. For each scan position, pixels in a region, hereinafter referred to as a "scan-window", of the target image defined by a projection of the mask-pattern on the target image are compared to corresponding pixels in the mask-pattern to determine, responsive to a "similarity criterion", whether corresponding pixels are similar. A distance, hereinafter a "separation distance", between the mask-pattern and the scan-window is defined responsive to the pixel comparisons, and a decision is made responsive to the image separation distance as to whether the scan-window contains the feature. If the separation distance is considered small enough, the mask-pattern and the scan-window are considered to match and the scan-window and the image determined to comprise the feature. In some procedures a "brute force", generally relatively slow procedure is used to determine whether a mask-pattern and a scan-window match, and each pixel in the scan mask-pattern is compared to each pixel in the image scan-window to provide a separation distance and therefrom as to whether there is a match.

D. I. Barnea and H. F. Silverman in an article entitled "A Class of Algorithms for Fast Digital Image Registration; IEEE Trans. Computer, vol. 21, no. 2. pp. 179-186, February 1972, describe a relatively fast matching procedure referred to as a "Sequential Similarity Detection Algorithm"—(SSDA). In accordance with the method, pixels in a mask-pattern are repeatedly, randomly chosen and compared to corresponding pixels in an image scan-window and the sum of absolute differences of the intensity values of compared pixels accumulated. If, as pixels are compared, the accumulated sum exceeds a predetermined threshold, the scan-window and the mask-pattern are determined to be dissimilar and not to match. After a predetermined number of comparisons, if the sum does not exceed the threshold, the mask-pattern and the image scan-window are determined to match. The method is considered to be relatively inaccurate and result in a relatively high incidence of mistaken decisions: decisions, referred to as "false positives", in which a scanning mask-pattern and an image scan-window are determined to match when in fact they don't; and decisions, referred to as "false negatives", in which a scanning mask-pattern and image scan-window are determined to mismatch when in fact they match.

SUMMARY

An aspect of some embodiments of the invention, relates to providing a relatively accurate method for determining whether a mask-pattern and an image scan-window are similar and therefore match, responsive to comparisons between pixels in the mask-pattern and corresponding pixels in the scan-window.

An aspect of some embodiments of the invention, relates to providing a relatively fast method for determining whether a mask-pattern and an image scan-window match responsive to comparisons between pixels in the mask-pattern and corresponding pixels in the scan-window.

For convenience of presentation, a comparison between pixels in a mask-pattern and an image scan-window is referred to as a "pixel test" and a method or process of determining whether there is a match between a mask-pattern and a scan-window responsive to pixel tests is referred to as a "match test". It is noted that to determine whether two patterns, e.g. a mask-pattern and a scan window, match, a positive decision can be made that the patterns are sufficiently similar to warrant a decision that there is match, or a negative decision made that the patterns are sufficiently dissimilar to warrant a decision that there is no match. Generally, the phrase "whether there is a match" and similar phrases include both possibilities, and a "match test" can of course provide a determination as to whether there is a match via either possibility. As discussed below, positive and negative decisions and the possibility of making positive and negative decisions are distinguished respectively by "S" (for similarity) and "NS" (for non similarity).

According to an aspect of some embodiments of the invention, a pixel test is a binary pixel test that returns a "yes" or "no" answer as to whether pixels in a mask-pattern and scan-window are similar or not. A pixel test is referred to as positive or providing a positive result if the pixel test results in a decision that pixels are similar and negative or providing a negative result if the pixel test results in a decision that pixels are dissimilar. A number of pixel tests performed for a given mask-pattern and image scan-window is indexed by the letter "n'" and a number of negative pixel test results is indicated by an index "k". A given k and n' pair is represented by (k,n') and k and n' are referred to as "decision coordinates".

According to an aspect of some embodiments of the invention, a separation distance between a mask-pattern and a scan-window of a target image comprises a Hamming distance, which is equal to a number of negative results obtained when a pixel test is performed for all the pixels in a mask-pattern and corresponding pixels in the scan-window. A number, k, of negative pixel tests obtained for a given number, n', of pixel tests performed for a mask-pattern and a corresponding scan-window is responsive to the Hamming separation distance for the mask-pattern and scan-window and pairs of decision coordinates, or values (k,n') are used to provide a decision as to whether the mask-pattern and scan-window match.

According to an aspect of some embodiments of the invention, for a given number n' of pixel tests and a given number k of negative tests, i.e. a given (k,n') pair of decision coordinates, a mask-pattern and a target image scan-window are determined to match if the determination has an expected probability of being incorrect that is substantially equal to or less than a predetermined upper bound "false positive" error "β". If a given (k,n') is associated with a decision that the mask-pattern and image scan-window match, the decision is said to indicate that the mask-pattern and image scan-window are similar and the decision is represented by the capital letter "S".

According to an aspect of some embodiments of the invention, for a given (k,n'), a mask-pattern and image scan-window are determined not to match if the determination has an expected probability of being incorrect that is substantially equal to or less than a predetermined upper bound "false negative" error "a". If a given (k,n') is associated with a decision that the mask-pattern and image scan-window do not match, the decision is said to indicate that the mask-pattern and image scan-window are not similar and the decision is represented by "NS".

According to an aspect of some embodiments of the invention, if for a given (k,n'), a positive or a negative decision as to whether a mask-pattern and target image scan-window match cannot be made for which the expected errors are less than or substantially equal to the upper bound errors β or α respectively, optionally at least one additional pixel test is performed. Information responsive to the at least one additional pixel test is used in providing a decision as to whether there is a match. If a given (k,n') is associated with a decision to perform at least one additional pixel test, the decision is said to indicate that performing pixel tests is to be continued and the decision is represented by "C".

According to an aspect of some embodiments of the invention, if for a given (k,n'), a positive or a negative decision as to whether a mask-pattern and image scan-window match cannot be made for which the errors are less than or substantially equal to the upper bound errors α or β respectively, optionally, a pixel test is performed for each of a relatively large number of pixels in the mask-pattern. A decision as to whether there is a match is determined responsive to a number pixel tests from the relatively large number (one for each of a relatively large number of pixels) of pixel tests performed that are negative pixel tests. Optionally, the relatively large number of pixels includes substantially all, or all of the pixels in the mask-pattern.

Performance of a pixel test for all or substantially all the pixels in a mask-pattern and corresponding pixels in a target image scan-window, is said to provide for the mask-pattern and scan-window an "exact" measure of an image separation distance for the mask-pattern and scan-window. A decision as to whether the mask-pattern and scan-window match, which is made responsive to the exact image separation distance is considered to be an exact decision and is represented by "E".

A set of decision coordinates (k,n') and their associated decisions S, NS, C and E is referred to as a "decision matrix" and for convenience is represented by "M". A time period required by a computer using a given decision matrix M in accordance with an embodiment of the invention to determine whether a mask-pattern and scan-window match is referred to as "running time" or "decision time". The running time for a given scan-window and mask-pattern generally depends on a configuration of a correspondence between decision coordinates (k,n') in matrix M and decisions S, NS, C and E as well as on a magnitude of an image separation distance between the scan-window and mask-pattern.

According to an aspect of some embodiments of the invention, a correspondence between decision coordinates (k,n') and decisions S, NS, C and E of a decision matrix M is configured to minimize an expected running time required by a computer using M to determine if a mask-pattern and scan-window match. Minimization is performed subject to constraints that the probabilities of false positives and false negatives are less than desired false positive and false negative upper bounds β or α respectively.

An aspect of some embodiments of the invention relates to using Baysian inference to configure a decision matrix M having a substantially minimized running time. In an embodiment of the invention, probabilities of false positives, false negatives, and expected running time are determined using Baysian inference. The running time of the matrix M is minimized responsive to the Baysian probabilities and expected running time.

In some embodiments of the invention, a match test to determine whether a mask-pattern and scan-window in a target image match is a "fixed-size" match test, in which every decision S, NS, and E is determined responsive to a same fixed number of pixel tests. In some embodiments of the invention, a match test is a sequential match test in which each of decisions S, NS, and E are made responsive to optionally different numbers of pixels tests. In some embodiments of the invention, a mask-pattern used in a match test is not rectangular. Optionally, a mask pattern is not a continuous pattern and comprises regions that are not connected.

It is noted that whereas a match test has been defined with respect to images, practice of embodiments of the invention are not limited to images and match tests in accordance with embodiments of the invention may be used to find and/or identify patterns in substantially any series of events or ordered configuration of events. For example, a match test in accordance with an embodiment of the invention may be used to identify a voice or find a pattern in an audio stream. By way of another example, a match test may be used in quality control of a production line and be applied to identify changes in rate of occurrence of defects in products produced on the production line.

There is therefore provided in accordance with an embodiment of the invention, A method of determining whether two patterns having a plurality of homologous regions match, comprising: generating a set of decisions associated with values (k,n) for determining whether the patterns match, where k, is a number of non similar homologous regions from a sample of size, n, of the homologous regions; constraining the decisions so that a probability of providing a false negative decision that there is no match when in fact there is a match is less than or equal to a predetermined upper bound α; configuring the association of decisions and pairs (k,n) to minimize running time of a computer programmed to use the set of decisions to determine whether there is a match; and using a computer programmed with the set of decisions to determine if the patterns match.

Optionally, the set of decisions comprises: a decision, NS, that the patterns do not match associated with each of a first set of pairs of values (k,n) and having a probability less than or equal to α; and a decision, C, for each of a second set of pairs of values (k,n) that the sample n must be increased to determine whether the patterns match. Additionally or alternatively, the probability of being wrong and providing a false negative decision is optionally determined responsive to a prior probability for frequency of occurrence of regions that are not similar.

Additionally or alternatively, the set of decisions optionally comprises a decision, S, associated with a third set of pairs of values (k,n) that the patterns match. Optionally, S has a probability of being incorrect and providing a false positive decision that there is a match when in fact there isn't, has a probability less than or equal to a predetermined upper bound $\beta$. Optionally, the probability of a decision S being wrong is determined responsive to a prior probability for frequency of occurrence of regions that are not similar.

In some embodiments of the invention, the set of decisions comprises a decision E to determine how many non-similar homologous regions there from among all the homologous regions associated with a fourth set of values (k,n). Optionally, all the decisions NS, S and E are associated with pairs of values (k,n) having a same n.

In some embodiments of the invention, patterns are considered to match in fact if a number of non-similar homologous regions from among all the homologous regions is less than or equal to a predetermined threshold, t, and in fact not to match if the number of non similar regions is greater than t. Optionally, the association of decisions and pairs (k,n) are configured to minimize a loss function responsive to the running time. Optionally, the loss function comprises a sum of an expected running time, a weighted probability of providing a false negative decision and a weighted probability of providing a false positive decision. Optionally, the weight for the false negative probability is less than or equal to $R_{E(0)}/[\alpha P(D\leq t)]$ where $R_{E(0)}$ is a running time for the computer to determine how many non-similar homologous regions there from among all the homologous regions and $P(D\leq t)$ is a probability that the patterns in fact match. Optionally, the weight for the false positive probability is less than or equal to $R_{E(0)}/[\beta P(D>t)]$ where $P(D>t)$ is a probability that the patterns in fact do not match.

There is further provided in accordance with an embodiment of the invention, a method of determining whether two patterns having a plurality of homologous regions match, comprising: generating a set of decisions comprising decisions NS that the patterns do not match associated with values (k,n), where k, is a number of non similar homologous regions from a sample of size, n, of the homologous regions; providing limits $\mathcal{A}=\beta/(1-\alpha)$ and $\mathcal{B}=\alpha/(1-\beta)$ where $\alpha$ and $\beta$ are upper bounds on probabilities of providing false negative and positive decisions respectively; determining a likelihood ratio $\lambda(k,n)$ as a function of (k,n) and a prior probability for frequency of occurrence of homologous regions that are not similar; constraining the association of decisions NS and values (k,n) responsive to a Wald's Sequential Probability Ratio Test using the likelihood ratio and the limits; and using a computer programmed with the decisions to determine if the patterns match. Optionally, a value (k,n) is associated with a decision NS if $\lambda(k,n)\geq \mathcal{B}$ and $\lambda(k-1,n)<\mathcal{B}$. Optionally, generating a set of decisions comprises generating decisions S that the patterns match associated with pairs of values (k,n). Optionally, wherein a value (k,n) is associated with a decision S if $\lambda(k,n)\leq \mathcal{A}$ and $\lambda(k-1,n)>\mathcal{A}$.

In some embodiments of the invention, the patterns are patterns comprised in images. Optionally, the patterns have a regular shape. Optionally, the patterns have an irregular shape In some embodiments of the invention, the patterns are continuous. In some embodiments of the invention, the patterns are not connected. In some embodiments of the invention, wherein the homologous regions are pixels. In some embodiments of the invention, the patterns are patterns comprised in a temporal sequence of events. Optionally, homologous regions are homologous periods. Additionally or alternatively, the sequence of events optionally comprises an audio stream.

In some embodiments of the invention, the patterns are patterns of at least one characteristic of an ordered ensemble of objects.

There is further provided in accordance with an embodiment of the invention, a set of decisions for determining whether first and second patterns having a plurality of homologous regions match responsive to a number, k, of non similar homologous regions from a sample of size, n, of the homologous regions, the set of decisions comprising: a decision, NS, that the patterns do not match associated with each of a first set of pairs of values (k,n) and having a probability less than or equal to a predetermined upper bound $\alpha$ of being wrong and providing a false negative decision when in fact there is a match; and a decision, C, for each of a second set of pairs of values (k,n) that the sample n must be increased to determine whether the patterns match; wherein the association of decisions and pairs (k,n) is configured so that if a computer is used to determine k for an increasing number n until a decision as to whether there is a match is provided, a running time for reaching the decision is substantially minimized.

Optionally, the probability of being wrong and providing a false negative decision is determined responsive to a prior probability for frequency of occurrence of regions that are not similar. Additionally or alternatively the set of decisions comprises a decision, S, associated with a third set of pairs of values (k,n) that the patterns match. Optionally, S has a probability of being incorrect and providing a false positive decision that there is a match when in fact there isn't, has a probability less than or equal to a predetermined upper bound $\beta$. Optionally, the probability of a decision S being wrong is determined responsive to a prior probability for frequency of occurrence of regions that are not similar.

In some embodiments of the invention, the set of decisions comprises a decision E to determine how many non-similar homologous regions there from among all the homologous regions associated with a fourth set of values (k,n). Optionally, all the decisions NS, S and E are associated with pairs of values (k,n) having a same n.

In some embodiments of the invention, the patterns are patterns comprised in images. Optionally, the patterns have a regular shape. Optionally, the patterns have an irregular shape In some embodiments of the invention, the patterns are continuous. In some embodiments of the invention, the patterns are not connected. In some embodiments of the invention, the homologous regions are pixels. In some embodiments of the invention, the patterns are patterns comprised in a temporal sequence of events. Optionally, homologous regions are homologous periods. Additionally or alternatively, the sequence of events optionally comprises an audio stream. In some embodiments of the invention, the patterns are patterns of at least one characteristic of an ordered ensemble of objects.

There is further provided in accordance with an embodiment of the invention, a computer readable medium containing a set of decisions in accordance with an embodiment of the invention, for programming a processor to determine if two patterns match.

There is further provided in accordance with an embodiment of the invention, a signal set containing a set of decisions in accordance with an embodiment of the invention, for programming a processor to determine if two patterns match.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1:
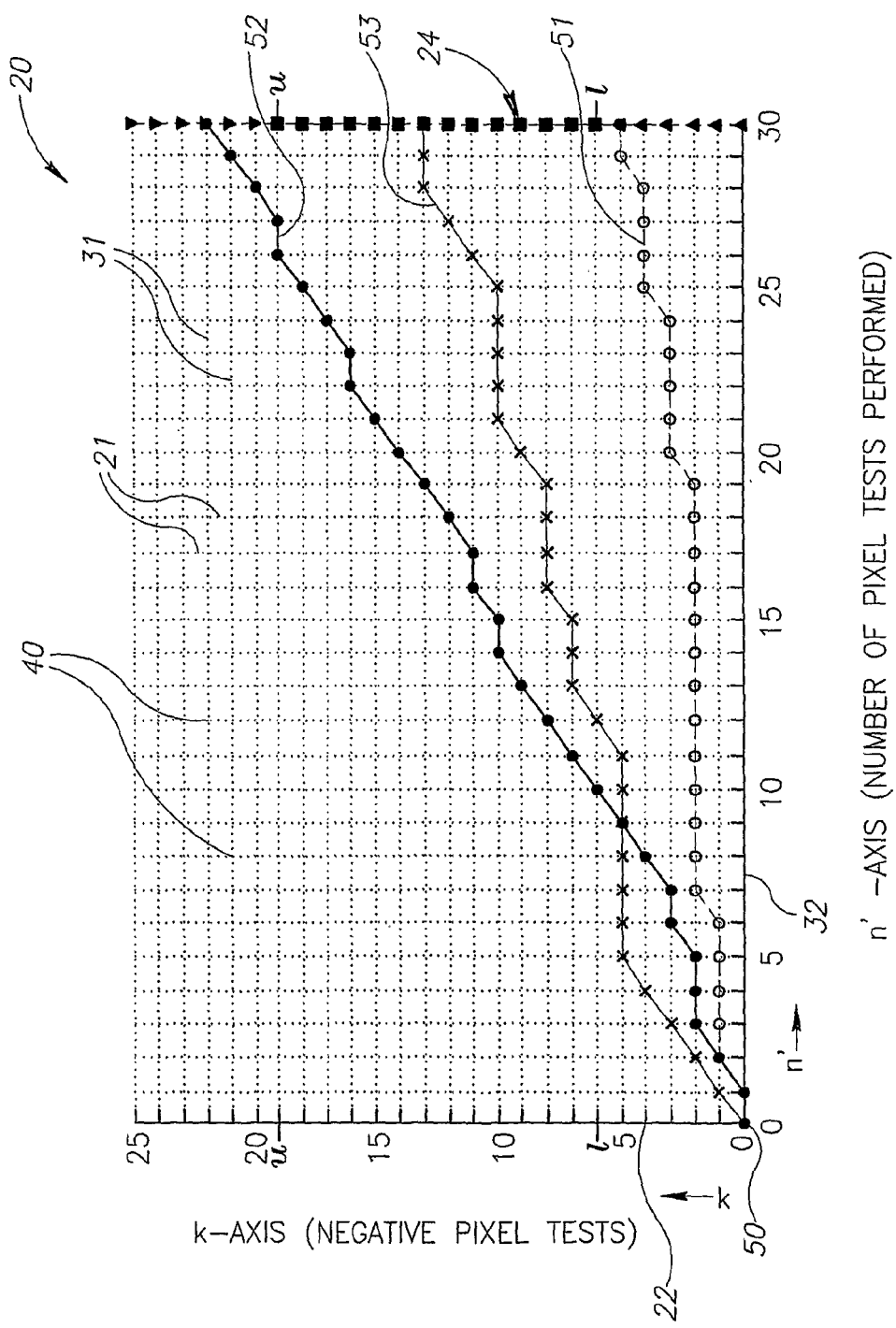
FIG. 1 schematically shows a fixed-size decision matrix that illustrates determining whether a mask-pattern and a target image scan-window match in accordance with an embodiment of the invention.

FIG. 1 shows a schematic fixed-size decision matrix 20 for graphically illustrating determining whether a scan-window (not shown) of a target image matches a mask-pattern (not shown), i.e. performing a match test on the mask-pattern and scan-window, in accordance with an embodiment of the invention.

Column boundary lines 21 that bound columns in matrix 20 are labeled by an index n', shown along an n'-axis 22, that represents a number of pixel tests performed for pixels in the mask-pattern and scan-window. Row boundary lines 31 that bound rows in the matrix are labeled by an index "k", shown along a k-axis 32, which represents a number of pixel tests that return a negative result. Each junction 40 of a row and column boundary line 21 and 31 is located by coordinates (k, n') i.e. a decision coordinate pair.

A last right most column boundary line 24, hereinafter referred to as "stop line" 24 is associated with a maximum value for n'=n, which is equal to a same fixed predetermined number of pixel tests that are performed to reach a decision of S, NS or E for every matching decision made using decision matrix 20. For convenience of presentation, n is shown equal to 30 in FIG. 1. The total number of pixel test n may of course differ from 30 and may differ substantially from 30. A method of determining n in accordance with an embodiment of the invention is discussed below.

History of a match test performed in accordance with decision matrix 20 as pixel tests are performed for a mask-pattern and a given associated scan-window is graphically represented by a "test trajectory". By way of example, in FIG. 1 three test schematic trajectories 51, 52 and 53 are shown which schematically represent respective histories of match tests performed using decision matrix 20 for a mask-pattern and each of three different image scan-windows.

A test trajectory, e.g. a trajectory 51, 52 or 53, of a match test shows for each n'-th pixel test performed in the match test, an accumulated number k of the n' pixel tests performed that have turned out to be negative. Every test trajectory therefore begins at an "origin of coordinates" 50 for which coordinate n'=k=0. As each new pixel test is performed, the trajectory moves to the right along the n'-axis a distance of one column width to increase n' by one and if the pixel test is negative moves up along the k-axis a distance of one row width to increase k by one. Since a total of n pixel tests are performed for each matching decision, every test trajectory ends at a point on stop line 24 at a coordinate (k,n) for which k has a value equal to a total count of negative pixel tests acquired in the performance of the n pixel tests in the match test.

In accordance with an embodiment of the invention, each point (k,n) along stop line 24 is associated with a decision S (similar), NS (not similar) or E (decide responsive to an exact measure of image separation distance). Points (k,n) associated with S are shown with an "up-pointing triangle, points associated with NS are shown with a down-pointing triangle and points associated with E are shown with a rectangle. A match test for a mask-pattern and a scan-window having a test trajectory that ends at a point (k,n) associated with a decision S or NS provides a decision that the mask-pattern and scan-window are respectively similar or not similar. If the test trajectory ends at a point (k,n) associated with a decision E, an exact measure of image separation distance for the mask-pattern and image scan-window is acquired by performing a pixel test for all pixels in the mask-pattern and the scan-window and whether there is a match is determined responsive to the exact separation distance. In FIG. 1, by way of example, test trajectories 51, 52 and 53 end at end points associated with S, NS and E respectively. The test trajectories are representative respectively of situations for which there is a match (Similar), there is not a match (Not Similar) and for a situation in which a decision is made responsive to an "Exact" image separation distance.

In accordance with an embodiment of the invention, thresholds l and u which are indicated in FIG. 1 along stop line 24 are provided for coordinate k for points (k,n) along the stop line so that points (k,n) for which k<l or k>u are respectively associated with decisions S and NS and points (k,n) for which l≦k≦u are associated with decision E. If a match test trajectory (e.g. trajectory 51) ends at a point for which k<l, the match test returns a result S, i.e. that a mask-pattern and a test window match, and if the trajectory (e.g. trajectory 52) ends at a point (k,n) for which k>u, the match test returns a result NS, i.e. that there is no match between the mask-pattern and the scan-window. If the trajectory (e.g. trajectory 53) ends at a point (kin) for which l≦k≦u, the match test determines whether there is a match responsive to an exact value for a separation distance between the mask-pattern and the scan-window.

Let P represent a mask-pattern having a spatial configuration, "A", (as noted above not necessarily rectangular or connected) comprising a total of |A| pixels. Let W represent a corresponding scan-window in a target image being tested to determine if it matches P, i.e. that it is similar to P. Let D(P,W) represent a separation distance between P and W and assume that it is desired to determine that P and W match if the separation distance is less than a "separation threshold "t". Let S(P,W,(x,y)) represent a pixel test to determine if a pixel in P having spatial coordinates (x,y) in A is similar to a homologous pixel in W. (It is noted that, as evidenced by examples given below, a pixel test may use data from more than one pixel to determine if a pixel or pixels are similar.) For convenience, let S(P,W,(x,y)) return a value of 1 if the pixels are similar and a value of 0 otherwise. Let a match test performed using decision matrix M be represented as "MT". MT returns a result S or NS. Then performing a match test to determine if P and W match using a decision matrix, in accordance with an embodiment of the invention, such as decision matrix 20 discussed above, may be written in symbols as comprising the following:

$$\text{Determine } k = \sum_{i=0}^{n} S(P, W, (x_i, y_i)); \quad (1)$$

If $k < l$ then $MT = S$;

if $k > u$ then $MT = NS$;

If $l \leq k \leq u$ perform $S(P, W, (x, y))$ for all pixels to determine $D(P, W)$ "exactly";

If $D(P, W) < t$ then $MT = S$; and

If $D(P, W) \geq t$ then $MT = NS$.

In the above, the sum shown for determining k represents performing pixel test r(P,W,(x,y)) n times for randomly chosen spatial coordinates $(x_i, y_i)$ in A. Randomly choosing instances of a parameter is hereinafter referred to as "sampling" the parameter.

In accordance with an embodiment of the invention, limits l and u and the total fixed number n of pixel tests performed are determined subject to conditions that decisions S and NS have expected probabilities of being wrong that are respectively less than desired false positive and false negative upper bounds β and α. The determination of l, u and n is also subject, in accordance with an embodiment of the invention, that running time of a match test be relatively small.

To illustrate determining l, u and n subject to the constraints noted above in accordance with an embodiment of the invention, let:

$P_{l,u,n}$(false negative) represent a probability that a match test MT provides a negative determination (no match) when there is in fact a match, i.e. the determination should have been positive;

$P_{l,u,n}$(false positive) represent a probability that MT provides a positive determination when there is no match, i.e. when the determination should have been negative; and $E_{l,u,n}$(running time) represent an expected running time of MT.

For a separation distance $D(P,W)=d$, let $P(In(k,n,d))$ represent a probability of a test trajectory, such as a test trajectory 51, 52 or 53, having a value k for a total number n of pixel tests. Then if spatial coordinates $(x_i, y_i)$ are sampled with replacement:

$$P(In(k,n,d)) = (d/|A|)^k (l-(d/|A|))^{n-k} \quad (2)$$

If spatial coordinates $(x_i, y_i)$ are sampled without replacement:

$$P(In(k, n, d)) = \left( \prod_{i=0}^{k-1} \frac{d-i}{|A|-i} \right) * \left( \prod_{i=0}^{n-k-1} \frac{|A|-d-i}{|A|-k-i} \right) \quad (3)$$

if $(d \geq k)$ and $(|A| - d \geq n - k)$ $= 0$ otherwise.

For a separation distance $D(P,W) \leq t$, for which P and W are considered to match, an intermediate sum of probabilities may be written:

$$\Omega_S[k, n] = \sum_{d=0}^{t} P(In(k, n, d)) P(D = d), \quad (4)$$

where $P(D=d)$ is a prior probability that separation distance $D(P,W)=d$.

Similarly, for a separation distance $D(P,W) \geq t+1$, for which P and W are considered not to match, an intermediate sum of probabilities may be written:

$$\Omega_{NS}[k, n] = \sum_{d=t+1}^{|A|} P(In(k, n, d)) P(D = d), \quad (5)$$

where |A|, as noted above, represents a total number of pixels in mask-pattern P.

Using equations (4) and (5) the probabilities of a false negative $P_{l,u,n}$(false negative), a false positive $P_{l,u,n}$(false positive) and an expected running time $E_{l,u,n}$(running time) for the match test MK using a decision matrix such as matrix 20 in accordance with an embodiment of the invention may be written:

$$P_{l,u,n}(\text{false negative}) = \frac{\sum_{k=u}^{n} \binom{n}{k} \Omega_S[k, n]}{P(D \leq t)} \quad (6)$$

$$P_{l,u,n}(\text{false positive}) = \frac{\sum_{k=0}^{l} \binom{n}{k} \Omega_{NS}[k, n]}{P(D > t)} \quad (7)$$

$$E_{l,u,n}(\text{running time}) = nR_I + \sum_{k=l+1}^{u-1} \binom{n}{k} (\Omega_S[k, n] + \Omega_{NS}[k, n]) R_{E(n)}. \quad (8)$$

In expression (6) $P(D \leq t)$ is a prior probability that the actual separation distance is less than or equal to threshold t. In expression (7) $P(D>t)$ is a prior probability that the actual separation distance is greater than threshold t. In expression (8), $R_I$ represents a period of time it takes to perform a pixel test $S(P,W,(x,y))$, and $R_{E(n)}$ represents a period of time it takes to perform a number of pixel tests required to determine $D(P,W)$, that is, to provide an exact measure of separation distance. If coordinates $(x_i, y_i)$ are sampled without replacement $R_{E(n)}$ is, as shown, dependent on n because if a decision is made to provide a matching decision responsive to $D(P,W)$, generally only a number of pixel tests equal to $|A|-n$ are required to determine $D(P,W)$ since n pixel tests have already been performed and can be used in determining $D(P,W)$.

From equation (8), it is seen that for a given n, $E_{l,u,n}$ (running time) decreases as l increases and u decreases. From equations (6) and (7) it is seen that $P_{l,u,n}$(false negative) increases as u decrease and $P_{l,u,n}$(false positive) increases as l increases. In accordance with an embodiment of the invention, for each n optionally from 1 to |A|, an optimum l and u are determined that minimizes expected running time $E_{l,u,n}$ (running time) by determining a largest for which $P_{l,u,n}$ (false positive)$\leq \alpha$ and a smallest u for which $P_{l,u,n}$(false negative)$\leq \alpha$. Optionally a largest l is determined by setting l=−1 and increasing l until $P_{l,u,n}$(false positive) is larger than β. Similarly, optionally, a smallest u is determined by setting u=n+1 and decreasing it until $P_{l,u,n}$(false negative) is greater than α. Once an optimum l and u have been determined for each n, an n having a smallest running time and its associated limits l and u are used to configure decision matrix 20.

Various types of pixel tests $S(P,W,(x,y))$ may be used in the practice of the invention, to determine whether pixels in a mask pattern and scan window are similar. In accordance with some embodiments of the invention, a determination of whether pixels are similar is made responsive to a "pixel" threshold $t_p$. Let p(x,y) and w(x,y) represent pixels at locations (x,y) in mask pattern P and scan window W respectively. Examples of "threshold" pixel tests in accordance with embodiments of the invention, are:

$$S(P,W,(x,y))=\delta((|\text{gray}(p(x,y))-\text{gray}(w(x,y))|)>t_p), \quad (10)$$

which is equal to 1 if an absolute difference in the gray level of pixels p(x,y) and w(x,y) is greater than $t_p$ and 0 otherwise;

$$S(P,W,(x,y))=\delta(\|L^*a^*b(p(x,y))-L^*a^*b(w(x,y))\|_2>t_p), \quad (11)$$

which is equal to 1 if an $l_2$ norm difference in the L*a*b color coordinates of pixels p(x,y) and w(x,y) is greater than $t_p$ and 0 otherwise; and $$S(P,W,(x,y))=\delta(\max[p(x,y)/w(x,y),w(x,y)/p(x,y)]>t_p), \quad (12)$$

which is equal to 1 if a maximum ratio of gray levels between pixels p(x,y) and w(x,y) is greater than $t_p$ and 0 otherwise.

In accordance with some embodiments of the invention, a pixel test is a relational test, which is a function of optionally two sets of coordinates $(x_1, y_1)$ and $(x_2, y_2)$ of which examples are:

$$S(P, W, (x, y)) = \begin{cases} 0 & \text{if } [p(x_1, y_1) > p(x_2, y_2) \text{ AND } w(x_1, y_1) > w(x_2, y_2)] \\ 0 & \text{if } [p(x_1, y_1) = p(x_2, y_2) \text{ AND } w(x_1, y_1) = w(x_2, y_2)] \\ 0 & \text{if } [p(x_1, y_1) < p(x_2, y_2) \text{ AND } w(x_1, y_1) < w(x_2, y_2)] \\ 1 & \text{otherwise} \end{cases} \quad (13)$$

$$S(P, W, (x, y)) = \begin{cases} 0 & \text{if } [p(x_1, y_1) = p(x_2, y_2) \text{ AND } w(x_1, y_1) = w(x_2, y_2)] \\ 0 & \text{if } [p(x_1, y_1) \neq p(x_2, y_2) \text{ AND } w(x_1, y_1) \neq w(x_2, y_2)] \\ 1 & \text{otherwise} \end{cases} \quad (14)$$

Figure 2:
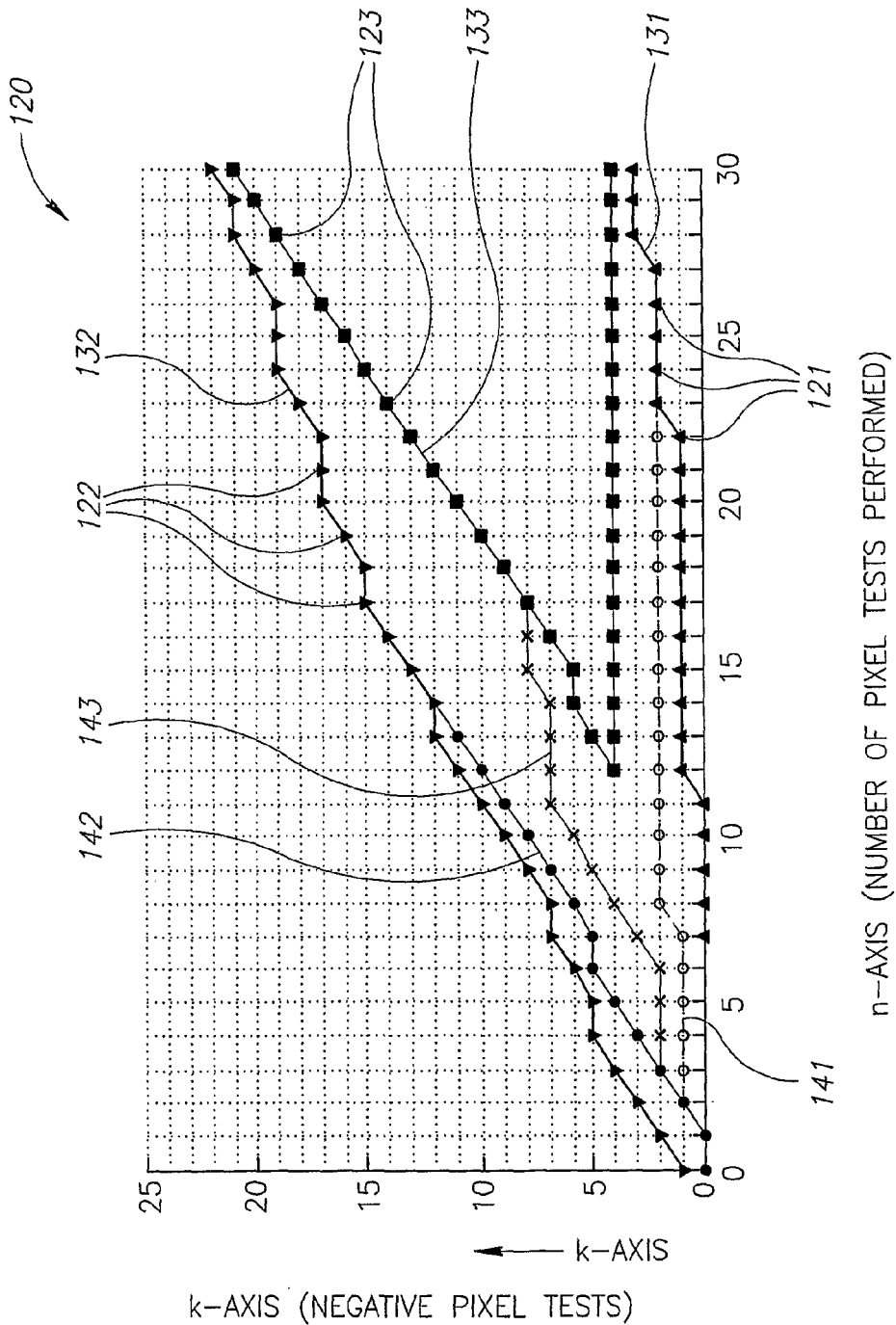
FIG. 2 schematically shows a sequential match test decision matrix that illustrates determining whether a mask-pattern and a target image scan-window match, in accordance with an embodiment of the invention.

FIG. 2 shows a schematic sequential decision matrix 120 for graphically illustrating determining whether a scan-window of a target image matches a mask-pattern, i.e. performing a match test on a mask-pattern P and scan-window W, in accordance with an embodiment of the invention. Like decision matrix 20, decision matrix 120 has a k-axis for indicating a number k of pixel tests that return a negative result from a number n of pixel tests performed for P and W to determine whether P and W match and test trajectories may be used to graphically show history of a sequential match test using matrix 120. Decision matrix has a maximum number of columns less than or equal to a number of pixels |A| in a mask-pattern used in accordance with the matrix to perform a match test.

However, unlike in a fixed-size match test using a matrix configuration similar to matrix 20, a sequential match test does not provide a matching decision S, NS, or E within a fixed, predetermined number of pixel tests. A different number of pixel tests may be performed before coming to an S, NS or E decision for different mask-patterns and/or scan-windows. As a result, matrix 120, unlike fixed-size matrix 20, has points other than points located on a rightmost stop line that are associated with decisions S, NS and E. In decision matrix 120, points 121 having coordinates (k,n) associated with an S decision are shown with an up-pointing triangle. Points 122 having coordinates (k,n) associated with an NS decision are shown with an up-pointing triangle. Points 123 associated with an E decision are shown with a rectangle. It is convenient to consider that points associated with a same decision S, NS or E define a boundary line in matrix 120. Points 121 associated with an S decision are connected by an S boundary line 131. NS and E boundary lines 132 and 133 respectively connect points 122 and 123 associated with NS and E decisions. It is noted that whereas E boundary line 133 is shown as a single, connected boundary line, there can be more than one E boundary lines delimiting unconnected regions in a decision matrix such as matrix 120.

Every test trajectory for a match test ends at a point on one of S, NS or E boundary lines 131, 132 and 133. Exemplary test trajectories 141, 142 and 143 in FIG. 2 end respectively on boundary lines 131, 132 and 133. Match tests for a mask pattern P and scan-window W associated with test trajectories 141 and 142 provide respective decisions that P and W do not match and do match. On the other hand, a match test associated with trajectory 143, which ends on E boundary line 133, requires acquiring an exact measure of D(P,W) to determine if there is or is not a match between a mask pattern P and scan-window W for which the match test is performed.

Performing a match test to determine if P and W match using a sequential decision matrix, in accordance with an embodiment of the invention, such as decision matrix 120 may be written as a following algorithm or "pseudo program":

15.1 Set k = n = 0
15.2 Perform a pixel test S(P, W, (x,y))
15.3 Set k = k + S(P, W, (x,y))
15.4 Set n = n+1
15.5 If (k,n) is a point on S boundary line 131 return "match" and END
15.6 If (k,n) is a point on NS boundary line 132 return "no match" and END
15.7 If (k,n) is a point on E boundary line 133 determine D(P, W)
15.8 If D(P, W) > t return "no match" and END
15.9 If D(P, W) ≤ t return "match" and END
15.10 Otherwise return to 15.2.

} 15

In accordance with an embodiment of the invention, S, NS and E boundary lines 131, 132 and 133 of sequential matrix 120 are determined subject to conditions that decisions S and NS have expected probabilities of being wrong that are respectively less than desired false negative and false positive upper bounds α and β. The determination of the boundary lines is also subject, in accordance with an embodiment of the invention, to a constraint that performance of a match test in accordance with sequential matrix 120 have a relatively small expected running time.

For a given configuration of boundary lines 131, 132 and 133 let probabilities of a false negative and a false positive being provided by sequential matrix 120 be represented by $P_M$(false negative) and $P_M$(false positive) and an expected running time of performing a match test in accordance with matrix 120 be represented by $E_M$(running time). Then the probabilities of false negatives, positives and the expected running time can be written:

$$P_M(\text{false negative}) = \frac{\sum_{\substack{(k,n): \\ M(k,n)=NS}} \Psi[k,n]\Omega_S[k,n]}{P(D \leq t)} \quad (16)$$

$$P_M(\text{false positive}) = \frac{\sum_{\substack{(k,n): \\ M(k,n)=S}} \Psi[k,n]\Omega_{NS}[k,n]}{P(D > t)} \quad (17)$$

$$E_M(\text{running time}) = \sum_{\substack{(k,n): \\ M(k,n) \in \{S,NS,E\}}} \Psi[k,n](\Omega_S[k,n]+\Omega_{NS}[k,n])nR_I + \quad (18)$$

$$\sum_{\substack{(k,n): \\ M(k,n)=E}} \Psi[k,n](\Omega_S[k,n]+\Omega_{NS}[k,n])R_{E(n)}$$

In expressions (16), (17) and (18) $\Psi[k,n]$ is a number of test trajectories that do not intersect a boundary line 131, 123 or 133 at a coordinate less than or equal to (n−1) and is determined for a given configuration of matrix 120 using any suitable algorithm. $\Omega_S[k,n]$ and $\Omega_{NS}[k,n]$ are intermediate sums defined in equations (4) and (5) respectively $\Omega_S[k,n]$ and $\Omega_{NS}[k,n]$ are determined using an assumed prior distribution for D(P,W). $P(D \leq t)$ is a prior probability that separation distance between a mask-pattern P and a scan-window WY is less than the separation threshold t, i.e. that P and W in fact match and P(D>t) a prior probability that they in fact don't match. Summation $$\sum_{\substack{(k,n): \\ M(k,n)=S}}$$

is performed for coordinates (k,n) for which sequential matrix 120 has a value S. Summation $$\sum_{\substack{(k,n): \\ M(k,n)=NS}}$$

is performed for coordinates (k,n) for which sequential matrix 120 has a value NS and summation $$\sum_{\substack{(k,n): \\ M(k,n)=E}}$$

is performed for coordinates (k,n) for which sequential matrix 120 has a value E. Summation $$\sum_{\substack{(k,n): \\ M(k,n) \in \{S,NS,E\}}}$$

is performed for coordinates (k,n) for which sequential matrix 120 has values S, NS or E.

In terms of $P_M$(false negative), $P_M$(false positive) and expected running time $E_M$(running time), the constraints noted above for configuring boundary lines of matrix 120 may be written:

$$\left.\begin{array}{l} P_M(\text{false negative}) \leq \alpha; \\ P_M(\text{false positive}) \leq \beta; \text{ and} \\ \text{MIN}[E_M(\text{running time})], \end{array}\right\} \quad (19)$$

where MIN [ . . . ] indicates determining a minimum value for an expression between the square brackets.

In accordance with an embodiment of the invention, a matrix 120 configured to satisfy the constraints of equations (19) is provided by determining a matrix that minimizes a loss function, which is dependent on the estimated running time $E_M$(running time) and weighted values of the false negative and false positive probabilities $P_M$(false negative) and $P_M$(false positive).

Let the weights that weight $P_M$(false negative) and $P_M$(false positive) be $w_o$ and $w_1$ respectively, and let the dependence of the loss function on the estimated running time and false negative and positive probabilities of matrix 120 be represented by "M" so that the loss function may be written, LOSS(M,$w_o$, $w_1$). In accordance with an embodiment of the invention, $$\text{LOSS}(M, w_o, w_1) = E_M(\text{running time}) + P_M(\text{false negative})P(D \leq t)w_o + P_M(\text{false positive})P(D > t)w_1. \quad (20)$$

The inventors have determined that for suitable values of $w_o$ and $w_1$, a sequential matrix 120, i.e. a matrix M, that minimizes LOSS(M,$w_o$, $w_1$) satisfies the constraints of equations (19).

In an embodiment of the invention, for given $w_o$ and $w_1$, a matrix 120 that minimizes LOSS(M,$w_o$, $w_1$) is found using a "backward induction technique". Using backward induction, a decision "value" (e.g. S, NS, E or C for continue) is assigned to each entry in each column of matrix 120 in order from a last column to a first column of the matrix. Entries in a last column of the matrix are, by definition allowed to have only S, NS or E decision values. In accordance with an embodiment of the invention, each entry is assigned a decision value that increments LOSS(M,$w_o$, $w_1$) by a smallest amount.

Let an additional loss, added to loss function LOSS(M,$w_o$, $w_1$) by a decision S, NS, E or C at entry (k,n) of matrix 120 be represented by respectively, AddLoss(k,n,S), AddLoss(k,n,NS), AddLoss(k,n,E), AddLoss(k,n,C). Let a maximum number of columns in matrix 120 be "N" so that a maximum value for a number of pixel tests performed using the matrix in a sequential match test is N. i.e. $n \leq N$, and let M(k,n) represent an entry at row k and column n of matrix 120. It is noted that N is less than or equal to a number of pixels |A| in a mask pattern used to perform the match test.

An algorithm for assigning decision values to matrix 120 using backward induction may be written:

```
Set n = N
For k = 0 to N
  M(k,n) = decision ∈ (S,NS, E) having minimum AddLoss(k,n,decision)
For n = (N-1) to 1
  For k = 0 to N
    M(k,n) = decision ∈ (S,NS,E,C) having minimum AddLoss(k,n,decision)
END
```
(21)

In accordance with an embodiment of the invention, AddLoss(k,n,decision) for the various decisions S, NS, E and C in (21) is calculated in accordance with the expressions:

$$AddLoss(k, n, S) = \frac{\Omega_{NS}[k, n]}{\Omega_S[k, n] + \Omega_{NS}[k, n]} w_1$$

$$AddLoss(k, n, NS) = \frac{\Omega_S[k, n]}{\Omega_S[k, n] + \Omega_{NS}[k, n]} w_0$$

$$AddLoss(k, n, E) = R_{E(n)}$$

$$AddLoss(k, n, C) = R_I + \frac{\Omega_S[k, n+1] + \Omega_{NS}[k, n+1]}{\Omega_S[k, n] + \Omega_{NS}[k, n]} L_{(k,n+1)} + \frac{\Omega_S[k+1, n+1] + \Omega_{NS}[k+1, n+1]}{\Omega_S[k, n] + \Omega_{NS}[k, n]} L_{(k+1,n+1)}$$

(22)

The inventors have determined that suitable values for $w_o$ and $w_1$ for which a matrix 120 that substantially minimizes LOSS(M,$w_o$, $w_1$) satisfies constraints (19), can be found for:

$$w_o \leq R_E(0)/[\alpha P(D \leq t)] \text{ and } w_1 \leq R_E(0)/[\beta P(D > t)].$$
(23)

In expression (23), $R_{E(0)}$ is an expected running time to acquire an exact measurement of D(P,W), i.e. to determine a separation distance responsive to performing a number of pixel tests equal to a number of pixels, e.g. |A|, in mask-pattern P.

Optionally, a binary search is performed to locate suitable values for $w_o$ and $w_1$ in the ranges noted in equations (23). For each set of candidate values for $w_o$ and $w_1$ presented by the binary search, a candidate matrix 120 is generated by minimizing equation 20 optionally using a backward induction algorithm similar to (21). False negative and false positive probabilities are determined for the candidate matrix, and if they are less than or sufficiently close to cc and β respectively, the candidate matrix is accepted as a suitable solution for equation (19).

The inventors have found that whereas a sequential match test performed using a sequential matrix 120 is relatively efficient and fast, generating matrix 120 responsive to equations (19), (20) and a backward induction algorithm such as that defined by expression (21)-(23) is relatively computation intensive. It is noted that generating matrix 120 is advantageously done off line.

Figure 3:
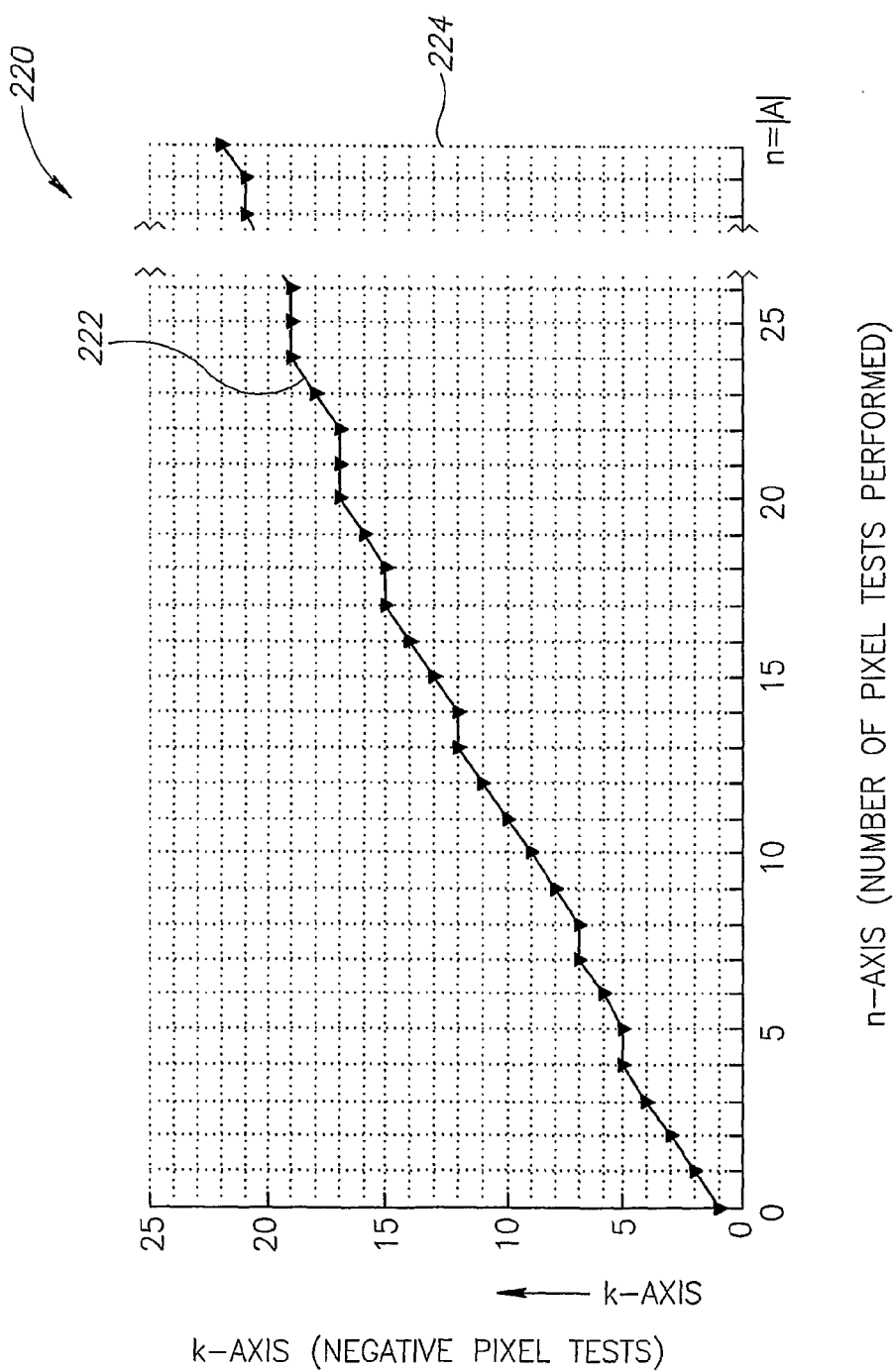
FIG. 3 schematically shows another sequential match test decision matrix that illustrates determining whether a mask-pattern and a target image scan-window match, in accordance with an embodiment of the invention.

In accordance with an embodiment of the invention, a sequential matrix, hereinafter referred to as a "truncated sequential matrix", is less computation intensive than matrix 120 discussed above. A truncated sequential decision matrix, in accordance with an embodiment of the invention, does not provide an option of a decision E and comprises an NS boundary line and optionally an S boundary line. By way of example, FIG. 3 schematically shows a truncated sequential matrix 220 having an NS boundary line 222. Optionally, truncated matrix 220 has a number, |A|, of columns equal to a number of pixels in a mask pattern used with the matrix to perform a match test.

A match test performed for a mask-pattern P and scan-window W in accordance with matrix 220 has a test trajectory that either ends on NS boundary line 222, on a last column line 224 of the matrix or on a last point of the NS boundary line that lies on the last column line. If the trajectory line ends on NS line 222, the match test is negative. If the trajectory ends on last column line 224, all the pixels in the mask-pattern and scan-window have been tested for similarity and an exact measure of separation distance D(P,W) between the mask-pattern and scan-window acquired. A decision as to whether there is a match is then made responsive to D(P,W) and a threshold t between what is considered to be a match and what is considered not to be a match, for example: if D(P,W)>t there is no match; otherwise there is a match.

A match test in accordance with truncated decision matrix 220 is computationally relatively simple and may be performed relatively quickly. For a given mask-pattern and scan-window, for each count n of performed pixel tests, a count k of accumulated negative pixel tests is readily checked in a relatively short period to see if the count lies on NS boundary line 222. If it does, there is no match, if it doesn't a next pixel test is performed. Since, generally, a probability of a match is very small, a number of instances that a match test concludes with all the pixels in the mask-pattern and scan-window tested for similarity is rare, and such instances do not contribute substantially to increasing an expected running time of match tests performed using the matrix.

In accordance with an embodiment of the invention, NS and S boundary lines are generated using a "prior based" Wald's Sequential Probability Ratio Test having a likelihood ratio:

$$\lambda(k,n) = P(k,n|P(D>t)/P(k,n|P(D \leq t);$$
(24)

and lower and upper bounds, "$\mathcal{A}$" and "$\mathcal{B}$", respectively for the likelihood ratio, which are functions of the false negative error α and false positive error β:

$$\mathcal{A} = \beta/(1-\alpha) \text{ and } \mathcal{B} = \alpha/(1-\beta).$$
(25)

The likelihood ratio is a ratio of a probability of having (k,n) for a mask-pattern P and a scan-window W that do not match to a probability of having the same (k,n) for a mask-pattern and scan-window that do match. The ratio for various values of k and n is calculated using a prior distribution for the separation distance D between P and W.

In accordance with an embodiment of the invention, NS boundary line 222 passes through points (n,k) of truncated matrix 220 that satisfy the following expressions:

$$\lambda(k,n) \geq \mathcal{B} \text{ and } \lambda(k-1,n) < \mathcal{B}.$$
(26)

Were truncated matrix 220 to have an S boundary line, in accordance with an embodiment of the invention, the line would be defined by points in the truncated matrix that satisfied the following expressions:

$$\lambda(k,n) \leq \mathcal{A} \text{ and } \lambda(k-1,n) > \mathcal{A} \tag{27}$$

Various prior probabilities are used in embodiments of the invention to determine a distribution of separation distances $P(D=d)$ and values for parameters, such as $\Omega_S[k, n]$ derived from the separation distances. Optionally, a prior distribution $P(D=d)$ is generated "experimentally" by computing separation distances for a mask-pattern and a plurality of scan-window in target images. In some embodiments of the invention, distribution is an a priori distribution, for example a Gaussian distribution. Optionally a prior distribution is a uniform distribution. The inventors have determined that performance of a match test such as a match test illustrated by decision matrices shown in FIGS. 1-3 in accordance with an embodiment of the invention, are relatively insensitive to choice of a prior distribution.

The inventors have carried out experiments to determine characteristics of match tests in accordance with embodiments of the invention and have found the match tests to be relatively robust and fast. For example, in one set of experiments a non-rectangular pattern of 2197 pixels was searched for in a sequence of 14, 640×480, frames. Using a sequential match test in accordance with an embodiment of the invention, similar to a match test illustrated in FIG. 3, the pattern was found with an average of only 23.76 pixels examined per scan-window instead of 2197 needed for an exact computation of separation distances. On a Pentium 4 3 GHz processor, the match test proceeds at 0.034 seconds per frame. The false positive error rate (percentage of non similar windows that the algorithm returned as similar) was 0%. The false negative error rate (percentage of similar windows that the algorithm returned as non similar) was 0.36%. Due to image "smoothness", there were several similar scan-windows in each frame near the sought object. The errors were mostly a result of missing one of these windows.

It is noted that generous use of matrices was made in the above descriptions to describe embodiments of the invention, however, embodiments of the invention are not limited by or to matrices. Matrices are convenient ways of organizing and thinking about data and procedures used to provide decisions in accordance with embodiments of the invention and to illustrate use of the data and performance of the procedures. The data and instructions for its use may of course be comprised in any appropriate configuration of a memory, such as a computer-readable storage medium, or in a signal set such as electronic signals propagated over the internet, which configuration may or may not resemble a matrix.

In the description and claims of the present application, each of the verbs, "comprise" "include" and "have", and conjugates thereof, are used to indicate that the object or objects of the verb are not necessarily an exhaustive listing of members, components, elements or parts of the subject or subjects of the verb.

The invention has been described with reference to embodiments thereof that are provided by way of example and are not intended to limit the scope of the invention. The described embodiments comprise different features, not all of which are required in all embodiments of the invention. Some embodiments of the invention utilize only some of the features or possible combinations of the features. Variations of embodiments of the described invention and embodiments of the invention comprising different combinations of features than those noted in the described embodiments will occur to persons of the art. The scope of the invention is limited only by the following claims.

The invention claimed is:

1. A method of determining whether two images having a plurality of homologous pixels match, comprising:
   generating a set of decisions associated with values (k,n) for determining whether the images match, where k, is a number of non similar pixels from a sample of size, n, of the pixels;
   constraining the decisions so that a probability of providing a false negative decision that there is no match when in fact there is a match is less than or equal to a predetermined upper bound α and that a Bayesian probability of providing a false positive decision that there is a match, when there is no match, is less than or equal to a predetermined upper bound β;
   configuring the association of decisions and pairs (k,n) to minimize a loss function responsive to a running time of a computer programmed to use the set of decisions in a sequential series of statistical hypothesis test to determine whether there is a match, wherein the loss function comprises a sum of an expected running time, a weighted probability of providing a false positive decision.

2. A method according to claim 1 wherein the set of decisions comprises:
   a decision, NS, that the images do not match associated with each of a first set of pairs of values (k,n) and having a probability less than or equal to α; and
   a decision, C, for each of a second set of pairs of values (k,n) that the sample n must be increased to determine whether the images match.

3. A method according to claim 1 wherein the probability of being wrong and providing a false negative decision is determined responsive to a prior probability for frequency of occurrence of regions that are not similar.

4. A method according to claim 2 wherein the set of decisions comprises a decision, S, associated with a third set of pairs of values (k,n) that the images match.

5. A method according to claim 4 wherein S has a probability of being incorrect and providing a false positive decision that there is a match when in fact there isn't, has a probability less than or equal to a predetermined upper bound β.

6. A method according to claim 5 wherein the probability of a decision S being wrong is determined responsive to a prior probability for frequency of occurrence of pixels that are not similar.

7. A method according to claim 4 and comprising a decision E to determine how many non-similar homologous pixels there are from among all the homologous pixels associated with a fourth set of values (k,n).

8. A method according to claim 7 wherein all the decisions NS, S and E are associated with pairs of values (k,n) having a same n.

9. A method according to claim 1 and comprising a decision E to determine how many non-similar pixels there are from among all the pixels associated with a fourth set of values (k,n).

10. A method according to claim 1 wherein the association of decisions and pairs (k,n) are configured to minimize a loss function responsive to the running time.

11. A method according to claim 10 wherein the loss function comprises a sum of an expected running time, a weighted probability of providing a false negative decision and a weighted probability of providing a false positive decision.

12. A method according to claim 11 wherein the weight for the false negative probability is less than or equal to $R_{E(0)}/[\alpha P(D\leq t)]$ where $R_{E(0)}$ is a running time for the computer to determine how many non-similar pixels from among all the pixels and $P(D\leq t)$ is a probability that the patterns in fact match.

13. A method according to claim 12 wherein the weight for the false positive probability is less than or equal to $R_{E(0)}/[\beta P(D>t)]$ where $P(D>t)$ is a probability that the patterns in fact do not match.

14. A set of decisions for determining whether first and second images having a plurality of pixels match responsive to a number, k, of non similar pixels from a sample of size, n, of the pixels, the set of decisions comprising:
   a computer processor;
   a memory;
   a decision, NS, that the second images do not match associated with each of a first set of pairs of values (k,n) and having a probability less than or equal to a predetermined upper bound a of being wrong and providing a false negative decision when in fact there is a match; and
   a decision, C, for each of a second set of pairs of values (k,n) that the sample n must be increased to determine whether the second images match,
   wherein the decisions are constrained so that a Bayesian probability of providing a false negative decision that there is no match when in fact there is a match is less than or equal to a predetermined upper bound $\alpha$ and that a Bayesian probability of providing a false positive decision that there is a match, when there is no match, is less than or equal to a predetermined upper bound $\beta$,
   wherein the association of decisions and pairs (k,n) is configured to minimize a loss function responsive to a running time of a computer programmed to use the set of decisions in a sequential series of statistical hypothesis test to determine whether there is a match, wherein the loss function comprises a sum of an expected running time, a weighted probability of providing a false positive decision, and
   wherein the decisions are stored on the memory and are executed by the computer processor.

15. A set of decisions according to claim 14 and comprising a decision E to determine how many non-similar pixels there are from among all the the pixels associated with a third set of values (k,n).

16. A set of decisions according to claim 15 wherein all the decisions NS, E, and a decision, S that the second images match, associated with a fourth set of pairs of values (k,n), are associated with pairs of values (k,n) having a same n.

17. A set of decisions according to claim 14 wherein the images are images comprised in a temporal sequence of events.

18. A method according to claim 17 wherein the sequence of events comprises an audio stream.

19. A non-transitory computer readable medium containing a set of decisions in accordance with claim 14 for programming a processor to determine if two images match.

20. A non-transitory computer readable medium containing a set of instructions for programming a processor to determine if two images match in accordance with claim 1.

21. A non-transitory computer readable medium containing a set of instructions for determining if two images match in accordance with claim 1.

* * * * *